(No Model.)
V. BÉLANGER.
MECHANICAL MOVEMENT.
No. 606,157. Patented June 21, 1898.
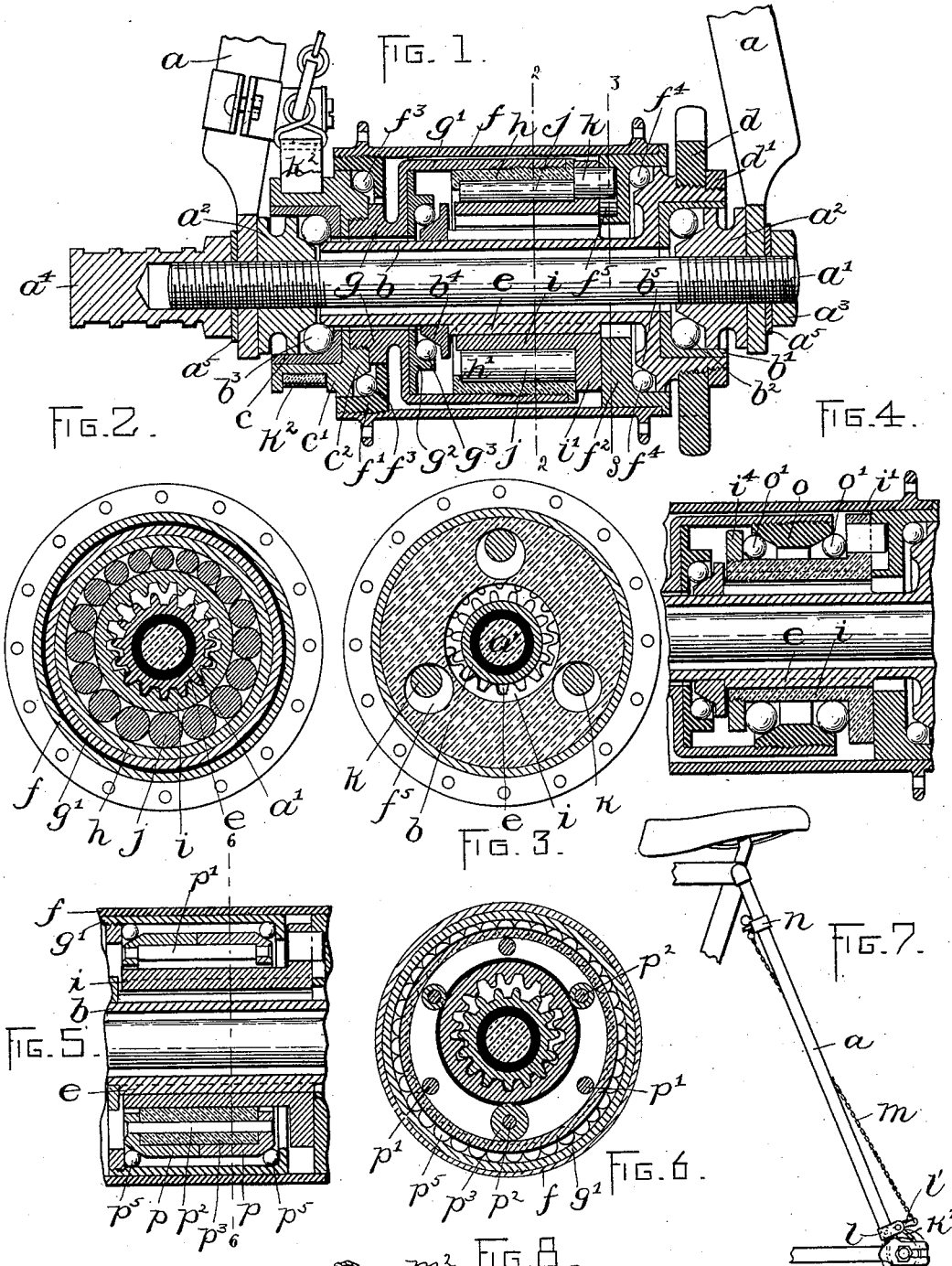
WITNESSES: 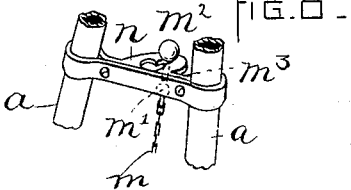 INVENTOR:

UNITED STATES PATENT OFFICE.

VICTOR BÉLANGER, OF BOSTON, MASSACHUSETTS, ASSIGNOR TO MRS. B. F. WEED, OF SAME PLACE.

MECHANICAL MOVEMENT.

SPECIFICATION forming part of Letters Patent No. 606,157, dated June 21, 1898.

Application filed February 8, 1897. Serial No. 622,453. (No model.)

*To all whom it may concern:*

Be it known that I, VICTOR BÉLANGER, of Boston, in the county of Suffolk and State of Massachusetts, have invented certain new and useful Improvements in Mechanical Movements, of which the following is a specification.

This invention has relation to mechanical movements, and has for its object to provide a power-transmitting mechanism for transferring power from a rotating shaft to another rotatable part, such as a hub or wheel, constructed in such way that the last-mentioned part may be driven at the same rate of speed as the first-mentioned part or at a slower rate of speed, at will, whereby a greater amount of power may be imparted to the hub or wheel without a corresponding increase in power in the first-mentioned shaft; or, in other words, the object of the invention is to provide an arrangement of gearing capable of being operated or manipulated in such way that the initial power may be multiplied with but a slight loss of speed.

To these ends the invention consists in certain new and useful features of construction and arrangement of parts, all as are illustrated in the drawings and now to be described in detail, and particularly pointed out in the claims hereto appended.

For the purpose of illustrating one embodiment of my invention I have shown it as being combined with the sprocket-wheel and rear wheel of a bicycle, so that—

Figure 1 represents a vertical longitudinal section through the hub of the rear wheel of a bicycle, a portion of the rear forks being illustrated in rear elevation. Fig. 2 is a transverse section on line 3 3 of Fig. 1. Fig. 3 is a similar section on line 3 3 of Fig. 1. Figs. 4 and 5 illustrate other forms of the invention as applied to a bicycle-wheel. Fig. 6 represents a cross-section on line 6 6 of Fig. 5. Figs. 7 and 8 illustrate means under the control of the rider for increasing the power which is transmitted from the sprocket-wheel to the rear wheel.

Of the drawings, $a$ $a$ indicate the rear forks of a bicycle, in which is rigidly secured the spindle $a'$, having the bearing-cones $a^2$ $a^2$, which are threaded thereon so as to be adjustable toward and from each other, and being locked against rotation under normal conditions by lock-nuts $a^3$ $a^4$, which bind the washers $a^5$ and the ends of the forks thereagainst.

$b$ indicates a sleeve which is enlarged at one end and provided with a bearing-ring $b'$, between which and one of the cones $a^2$ are placed a series of antifriction-balls $b^2$. The opposite end of the sleeve is held in position by a series of antifriction-balls $b^3$, which are held against the cone by a friction-ring $c$, inserted in a collar $c'$, having a cone $c^2$, and to be afterward described. The enlarged end of the sleeve is externally threaded to receive a prime power or main driving sprocket-wheel $d$, from which power is applied from the crankshaft in any suitable or desired way, said sprocket-wheel being held thereon by means of a locking-nut $d'$. When the said sprocket-wheel is revolved, it rotates with it the sleeve $b$. Intermediate of its ends the said sleeve is formed with external teeth, constituting what may be termed a "pinion" or "toothed gear" $e$, there being also rigidly fitted upon the sleeve a bearing-cone $b^4$. The enlarged end of the said sleeve is likewise formed into an inwardly-projecting cone $b^5$, all of these features just described being more clearly illustrated in Fig. 1.

The hub $f$ of the rear wheel is threaded at one end to receive a bearing-ring $f'$ to oppose the cone $c^2$ on the collar $c'$, while into the other end of the hub is forced a bearing-ring $f^2$ to oppose the said cone $b^5$, there being suitable antifriction-balls $f^3$ $f^4$ placed between the cone $c^2$ and the ring $f'$ and the cone $b^5$ and the ring $f^2$, respectively, so that the hub may rotate relatively to the sleeve $b$ on antifriction-bearings.

The collar $c'$ is provided with an internally-threaded recess to receive the hub $g$ of a cup $g'$, which is substantially cylindrical and fits loosely within the hub $f$.

Secured in the cup is a hardened bearing-ring $g^2$, between which and the bearing-cone $b^4$, before described, are placed antifriction-balls $g^3$, so that the collar $c'$ and the cup $g'$ are capable of revolving about the sleeve and the spindle $a'$ on antifriction-bearings. The cup is internally threaded at its ends to receive a bearing consisting of a hardened bushing or ring $h$.

Between the bearing or ring $h$ and the pinion or gear $e$, formed on the sleeve $b$, is placed eccentrically a ring $i$, which is preferably of hardened steel and which is formed with internal teeth, as shown in Fig. 2, the ring being in engagement with the said pinion $e$ at one point, as is clearly illustrated, the diameters of the pitch-circles of the teeth of the ring and the pinion being substantially as shown.

The toothed ring is held in its position by means of antifriction-rolls $j$, of different diameters to correspond to the varying distances between the periphery of the ring and the internal wall of the ring $h$.

The rolls are held against longitudinal movement by a flange $h'$ on the ring $h$ and a flange $i'$ on the eccentric ring $i$, and the said ring $i$ is secured to the bearing-ring $f^2$, before described, by pins $k$, inserted in the flange $i'$ and projecting into recesses or sockets $f^5$ in the said bearing-ring $f^2$.

Now it will be seen that the hub and its bearing-rings $f'$ $f^2$ are secured to the eccentrically-arranged ring, so that they will all rotate together, although the said toothed ring is not rigidly secured to the bearing-ring $f^2$, but is capable of a slight movement relatively thereto, this being permitted by the enlarged sockets $f^5$, which must be provided, as the toothed ring revolves on an axis parallel to and at a small distance from the axis of revolution of the sleeve $b$.

The collar $c'$, before described, is formed in its periphery with a groove to receive a strap-brake $k^2$, having one end secured to a clip $l$ on one of the rear forks $a$ and having its other end secured to a bell-crank lever $l'$, whose outer arm is adapted to be drawn upward, causing positive engagement of the strip with the collar by means of a chain $m$, having on its outer end balls or enlargements $m'$ $m^2$, connected by a bar $m^3$. (Indicated by dotted lines shown in Fig. 8.) The said bar $m^3$ passes through a keyhole-slot in a clip $n$, secured to the forks $a$ $a$ at a point near the saddle and within reach of the rider. When the ball $m'$ is drawn through the enlarged portion of the keyhole-slot and rests upon the clip $n$, the brake-strap locks the collar $c'$ against movement.

Under ordinary conditions when the bicycle is traveling on a comparatively level road where no great amount of power is required to rotate the driven wheel the brake-strap is loosened by allowing the enlargement or ball $m'$ to slide through the slot in the clip. Then the rotation of the sprocket-wheel $f$ causes a corresponding rotation of the sleeve $b$, which, being locked into engagement with the internally-toothed ring $i$, revolves the said ring about the axis of the spindle $a'$, and through the medium of the pins $k$ causes a corresponding rotation of the hub $f$, and the parts rotate about the cones $a^2$ $a^2$. The rotation of the sleeve in this event does not cause the movement of the internally-toothed ring relatively to the pinion, as more friction would be encountered in so doing than is required to revolve all of the parts about the cone-bearings $a^2$. When, however, the rider is about to ascend a grade and wishes to increase the power transmitted to the bicycle-wheel without increasing his own effort, the brake-chain is drawn upward to lock the brake-strap $k^2$ to the collar $c'$. The following is the result: The cup $g'$ being rigidly secured to the collar $c'$ is held against rotation, and with it is also held the hardened bearing-ring $h$. Hence the revolution of the sprocket-wheel $d$ and the sleeve $b$ causes the pinion $e$ to revolve the internally-tooth ring $i$ at a speed a little less than the rotation of the sprocket-wheel, and the rotation of the toothed ring is imparted through the pins $k$ to the bearing-ring $f^2$ and the hub $f$, so that the wheel travels at a slightly lower rate of speed than the sprocket-wheel $d$, but with greatly-increased power. The antifriction-balls $f^3$ and $f^4$ act to prevent any material friction between the hub and the cones $c^2$ and $b^5$.

In Fig. 4 I have illustrated a slightly-modified form of my invention in which the bearing-ring $o$ in the cup $g'$ is beveled to receive two sets of antifriction-balls $o'$ $o'$, inserted between it and the internally-toothed eccentrically-placed ring $i$, which is in this case provided with a threaded collar $i^4$ at its end opposite the flange $i'$. In other respects the construction is similar to that illustrated in Figs. 1 and 3.

In Figs. 5 and 6 I have illustrated a spider consisting of two flanged sections $p$ $p$, united by cross-bars $p'$ $p^2$, arranged alternately, there being rollers of different diameters journaled on the bars $p^2$ and bearing against the eccentrically-placed ring $i$. The spider is concentric of the cup $g'$ and is revoluble in the same, being held in position by antifriction-balls $p^5$ $p^5$. It is not essential that the rollers in this event be of varying diameters, as they are not intended to bear against the inner surfaces of the spider, and hence they may be of the same size; but the spider, the antifriction-balls $p^5$ $p^5$, and the rollers $p^3$ all constitute the equivalent of the graded balls in the other figures, as like the latter they form antifriction devices of greater thickness on one side of the axis of the gear to hold the toothed ring eccentrically and in mesh with the said gear.

In all the constructions which I have illustrated the rider may greatly increase the power transmitted from the sprocket-wheel to the hub of the driving-wheel of the bicycle without very materially lessening the speed of rotation of the latter by means of the brake, which is easily controlled by him, even though the bicycle be going more or less rapidly.

Of course it will be understood that while I have chosen to illustrate my invention as being employed in connection with a bicycle, yet I do not intend to limit myself to such adaptation, as there are many other uses to which the invention may be put.

Having thus explained the nature of the invention and described a way of constructing and using the same, though without attempting to set forth all of the forms in which it may be made or all of the modes of its use, I declare that what I claim is—

1. A mechanical movement, comprising a toothed gear; a revoluble toothed ring arranged eccentrically of the said gear and in engagement therewith; an outer wheel concentric with the said gear; a bearing concentric with the said gear; antifriction devices interposed between the said ring and the bearing of greater thickness on one side of the axis of the gear; and means operable at will for holding the bearing against rotation.

2. A mechanical movement comprising a power-transmitting pinion, an outer hub or wheel concentric with the pinion, an intermediate eccentrically-arranged internally-toothed ring meshing with the pinion, and connected to said hub or wheel, antifriction rollers or balls having different diameters for maintaining said ring in its eccentric arrangement, and means controllable at will for causing said pinion to revolve said ring about the axis of said ring or else about the axis of the pinion.

3. A mechanical movement comprising a power-transmitting pinion, an outer hub or wheel concentric with the pinion, an intermediate eccentrically-arranged internally-toothed ring meshing with the pinion, and connected to said hub or wheel, a bearing concentric with the hub and arranged between the hub and the internally-toothed ring, means for holding said bearing stationary and releasing it, and antifriction devices having varying diameters interposed between the toothed ring and the bearing.

4. A mechanical movement comprising a power-transmitting pinion, an outer hub or wheel concentric with the pinion, an intermediate eccentrically-arranged toothed ring meshing with the pinion, and connected to said hub or wheel, a bearing concentric with the hub and arranged between the hub and the internally-toothed ring, a revoluble cup in which said bearing is mounted, antifriction-bearings for said cup, antifriction devices between the bearing and the ring of greater thickness on one side of the axis of said bearing, and a brake-strap operable at will for locking said cup and said bearing against rotation.

5. A mechanical movement comprising a toothed gear, an outer hub or wheel concentric with the gear, an eccentrically-arranged toothed ring meshing with the gear, a bearing concentric with the hub, means for holding said bearing stationary and releasing it, and antifriction devices of greater thickness on one side of the axis of the bearing interposed between the said toothed ring and said bearing and revoluble about the axis of said gear.

6. In combination, a spindle having a bearing-cone at each end, a sleeve formed with external gear-teeth intermediate of its ends, antifriction-balls interposed between said sleeve and said cones, a sprocket-wheel mounted on the end of said sleeve, a wheel-hub concentric with the pinion, an internally-toothed ring arranged eccentrically about the external teeth of the sleeve and in engagement therewith, means connecting said toothed ring to said hub, a revoluble bearing concentric with the pinion and the wheel-hub, said bearing being mounted on antifriction-bearings, antifriction devices having different diameters interposed between said bearing and said toothed ring, and means operable at will for holding said revoluble bearing against rotation.

7. A mechanical movement comprising a spindle, a hub concentric with the spindle, a toothed gear concentric with said spindle, a toothed ring eccentric of the spindle and intermeshing with the toothed gear, a bearing concentric with said spindle, antifriction devices having varying diameters and placed between said toothed ring and said bearing, and controllable means for locking or releasing the said bearing whereby the said ring may revolve on its own axis or on the axis of the spindle.

In testimony whereof I have signed my name to this specification, in the presence of two subscribing witnesses, this 1st day of February, A. D. 1897.

VICTOR BÉLANGER.

Witnesses:
A. D. HARRISON,
P. W. PEZZETTI.